(12) United States Patent
Kaufmann et al.

(10) Patent No.: US 10,875,099 B2
(45) Date of Patent: Dec. 29, 2020

(54) TURNING TOOL HOLDER AND TURNING TOOL

(71) Applicant: Kennametal Inc., Latrobe, PA (US)

(72) Inventors: Igor Kaufmann, Fürth (DE); Sathish Kumar Nagarajan, Hosur (IN); Manoj Krishnamoorthy, Bangalore (IN); Anwar Sadat Mohideen Abdul, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 130 days.

(21) Appl. No.: 16/247,154

(22) Filed: Jan. 14, 2019

(65) Prior Publication Data

US 2019/0217397 A1 Jul. 18, 2019

(30) Foreign Application Priority Data

Jan. 15, 2018 (DE) .......................... 10 2018 100 783

(51) Int. Cl.
  *B23B 27/10* (2006.01)
  *B23B 29/04* (2006.01)
  *B23Q 11/10* (2006.01)

(52) U.S. Cl.
  CPC ............ *B23B 27/10* (2013.01); *B23B 29/043* (2013.01); *B23B 2250/12* (2013.01); *B23Q 11/10* (2013.01)

(58) Field of Classification Search
  CPC ..... B23B 27/10; B23B 2205/02; B23B 51/06; B23Q 11/10; B23C 5/28
  See application file for complete search history.

(56) References Cited

U.S. PATENT DOCUMENTS

| | | | |
|---|---|---|---|
| 4,621,547 A | 11/1986 | Yankoff | |
| 4,642,001 A | 2/1987 | Gill | |
| 5,272,945 A | 12/1993 | Lockard | |
| 5,330,297 A | 7/1994 | Engstrand | |
| 2010/0178117 A1 | 7/2010 | Watanabe | |
| 2014/0030033 A1 | 1/2014 | Luik | |

(Continued)

FOREIGN PATENT DOCUMENTS

| | | |
|---|---|---|
| DE | 3740814 A1 | 6/1989 |
| DE | 102011016148 A1 | 10/2012 |

(Continued)

OTHER PUBLICATIONS

Jan. 9, 2019 Foreign OA P17-06267-DE-NP.

*Primary Examiner* — Nicole N Ramos
(74) *Attorney, Agent, or Firm* — Larry R. Meenan

(57) ABSTRACT

A turning tool holder with a turning tool holder shank and a turning tool holder head is described. In an installed position of the turning tool holder, a longitudinal extension direction of the turning tool holder head is a longitudinal extension direction of the turning tool holder shank which continues straight-ahead, at an angle, or over a radius. The turning tool holder head, seen in its longitudinal extension direction, thereby has two side faces, wherein a lateral coolant outlet is provided on one of the side faces, the lateral coolant outlet center axis of which lateral coolant outlet, in plan view, is predominantly oriented along the longitudinal extension direction of the turning tool holder head. In addition, a turning tool with such a turning tool holder is presented.

10 Claims, 4 Drawing Sheets

(56) References Cited

U.S. PATENT DOCUMENTS

2015/0328688 A1   11/2015  Johansson
2016/0236281 A1*  8/2016  Kitagawa ................ B23B 27/10
2020/0038962 A1*  2/2020  Kobayashi .............. B23B 27/04

FOREIGN PATENT DOCUMENTS

IE             840737       9/1985
WO    WO2017129414 A1   8/2017

* cited by examiner

TURNING TOOL HOLDER AND TURNING TOOL

RELATED APPLICATION DATA

The present application claims priority pursuant to 35 U.S.C. § 119(a) to German Patent Application No. 102018100783.3 filed Jan. 15, 2018, which is incorporated herein by reference in its entirety.

FIELD

The invention relates to a turning tool holder with a turning tool holder shank and a turning tool holder head, wherein in an installed position of the turning tool holder a longitudinal extension direction of the turning tool holder head is a longitudinal extension direction of the turning tool holder shank that continues straight-ahead, across an angle or across a radius; and the turning tool holder head, viewed in its longitudinal extension direction, has a top face, an underside face opposite to this, and also two opposing side faces respectively connecting the top face and the underside face. The invention further relates to a turning tool with such a turning tool holder.

BACKGROUND

In this case, a turning tool holder is to be understood as meaning in particular a tool holder which, together with a cutting insert, for example together with an indexable insert, forms a turning tool.

The invention is applicable without restriction to all kinds of turning tool holders.

A longitudinal extension direction of the turning tool holder head which is a straight continuation of the longitudinal extension direction of the turning tool holder shank is, for example, present in neutral turning tools intended for external machining, internal machining, plunge cutting, parting off, and/or thread cutting.

In left hand-cutting and right hand-cutting turning tools that are executed without a gap or the like, the longitudinal extension direction of the turning tool holder head is also a straight continuation of the longitudinal extension direction of the turning tool holder shank. Left hand-cutting and right hand-cutting turning tools can also be used for external machining, internal machining, plunge cutting, parting off, and/or thread cutting.

By contrast, the longitudinal extension direction of the turning tool holder head is a longitudinal extension direction of the turning tool holder shank which continues at an angle, or across a radius if the turning tool holder head is offset, curved away, or angled with respect to the turning tool holder shank. This is in particular the case with left hand-cutting and right hand-cutting turning tools. Even with these, an external machining, internal machining, plunge cutting, parting off and/or thread cutting can be performed.

Turning tools and turning tool holders of this kind are known from prior art.

It is also known to introduce coolant or cooling lubricant into the cutting zone in order to ensure a high cutting performance and/or a long service life for turning tools. This can be done via the turning tool holder, which is then equipped with the appropriate coolant or cooling lubricant channels.

In this context, US 2015/0328688 A1, for example, shows a turning tool holder in which coolant or cooling lubricant can be introduced from above into a cutting zone. In addition, the coolant or cooling lubricant can be conveyed via a cutting insert into the cutting zone.

A turning tool holder is also known from EP 2 946 857 A1, in which coolant or cooling lubricant can be introduced into a cutting zone from above and through a support piece arranged on the turning tool holder.

For better readability, only the term "coolant" will be used hereinafter, wherein cooling lubricant is naturally also meant by this.

SUMMARY

It is the object of the invention to provide a turning tool holder with which the cutting performance and/or the tool service life given turning can be increased further.

The object is achieved by a turning tool holder in which a lateral coolant outlet is provided on one of the side faces, the lateral coolant outlet center axis of which, in plan view, is predominantly oriented along the longitudinal extension direction of the turning tool holder head. A plan view here means a substantially vertical view of the top face. By coolant outlet center axes predominantly oriented along the longitudinal extension direction of the turning tool holder head, what is meant are coolant outlet center axes which lie within a range of ±45 degrees about the longitudinal extension direction of the turning tool holder head. In plan view, the extension portion along the longitudinal extension direction is therefore greater than or equal to an extension portion transversal to the longitudinal extension direction. In particular, the coolant outlet center axes lie within a range of ±30 degrees, more particularly within a range of ±20 degrees about the longitudinal extension direction of the turning tool holder head. Since coolant can essentially only be sprayed or emitted in a straight line if it has left a coolant supply system via a coolant outlet, coolant outlet center axes oriented in this way offer the advantage of being able to provide coolant to a geometrically particularly large portion of the cutting zone, and/or to a particularly large portion of a cutting insert. In this way, a reliable and effective cooling of the cutting insert and/or the cutting zone is achieved.

The turning tool holder can be an external turning tool holder. A turning tool holder is thus provided in which, in addition to known coolant outlets, coolant outlets are provided on the side faces as well. The cutting zone can thus be supplied with a particularly large volume flow of coolant, thereby ensuring a high cutting performance and/or long service life of the associated turning tool. In addition, coolant is introduced in this way into the cutting zone from a side from which no coolant has previously been supplied. This results in a particularly uniform cooling, which also has a positive effect on cutting performance and tool service life.

In particular, the side faces are two opposite, flat, parallel side faces which define the width of the turning tool holder head.

In accordance with one embodiment, the lateral coolant outlet is connected in a coolant-conducting manner to a coolant inlet, wherein the coolant inlet is arranged on the tool holder shank, in particular on its rear face facing away from the turning tool holder head. The coolant inlet is thus easily accessible and connectable in a simple manner to a coolant supply system of the machine tool on which the turning tool holder is being used. Alternatively, the turning tool holder can also be connected in a simple manner to an external coolant supply system separate from the machine tool.

The turning tool holder is preferably a single piece; in other words, the turning tool holder head and the turning tool holder shank are manufactured as a single piece. The turning tool holder is thus particularly mechanically stable. Assembly steps in the manufacture of the turning tool holder can be completely eliminated, so that its manufacture involves comparatively little effort. In particular, the turning tool holder has no clamps, executed as separate components, for mounting a cutting insert.

In plan view, a plurality of lateral coolant outlets are advantageously provided on one of the side faces and their lateral coolant outlet center axes are predominantly oriented along the extension direction of the turning tool holder head. Preferably, two or three coolant outlets are provided. In this way, the cutting zone can be supplied with a particularly large volumetric flow of coolant, whereby a particularly good cooling performance is achieved. In addition, a good, meaning a uniform, distribution of the coolant in the cutting zone can be achieved via the multiple coolant outlets. Both contribute to a long tool service life and a high cutting performance.

The lateral coolant outlet or the lateral coolant outlets are preferably provided on a laterally projecting extension of one of the side faces. The laterally projecting extension can also be described as a lateral island. Via the laterally projecting extension or the lateral island, it is possible to shape a precisely oriented jet of coolant which is introduced into the zone to be cooled without any or with only slight dispersion losses. Cooling is thus targeted and efficient. Here, a coolant jet preferably hits an area to be cooled or an edge to be cooled at a relatively shallow angle. Under the assumption of a circular cross-section of the coolant jet, the result is that the coolant jet strikes an essentially elliptical area. Even if the coolant jet has different cross-sectional forms, the impact surface will have an elongated shape. This elongated shape is advantageously oriented along an edge to be cooled. A particularly good coverage with coolant of an edge to be cooled thus results, and thus a particularly effective cooling. A front face can also be provided on a face of the turning tool holder head opposite the turning tool holder shank, wherein a frontal coolant outlet is provided on the front face, the frontal coolant outlet center axis of which coolant outlet is, in plan view, predominantly oriented transversal to the longitudinal extension direction of the turning tool holder head, in particular wherein the frontal coolant outlet is provided on a frontally projecting extension of the front face. Coolant is thus introduced into the cutting zone from an additional direction. This results in an especially effective cooling of the cutting zone, in particular in conjunction with the aforementioned coolant outlets. Due to the coolant being introduced into the cutting zone from different sides, a particularly homogeneous cooling effect can be achieved.

The frontally projecting extension can also be referred to as a frontal island. Here, too, a precisely aligned jet of coolant can be formed via the frontally projecting extension or the frontal island, said jet being introduced into the zone to be cooled without any or with only slight dispersion losses. In this respect, the cooling is thus targeted and efficient.

Seen in a front view, the frontal coolant outlet center axis can be inclined upwards by 0 degrees to 80 degrees, in particular by 15 degrees to 60 degrees, more particularly by 35 degrees to 50 degrees. The coolant is thus introduced into the cutting zone obliquely from below or substantially horizontally. What is known as a flank cooling is thus advantageously ensured.

In a variant, the frontally projecting extension has a plate-shaped design whose thickness runs in the longitudinal extension direction of the turning tool holder head, and the extension has a front face facing toward a mounting pocket for a cutting insert, at which front face the frontal coolant outlet terminates. The thickness of the plate-shaped extension is therefore in particular to be measured perpendicular to the front face. In this way, coolant can be conveyed easily and directly in the direction of the mounting pocket.

The front face is preferably directed obliquely upwards to the top face and to one of the side faces of the turning tool holder head. Thus, the at least one coolant outlet arranged on the front face is oriented in the same way. It is thus essentially directed at the cutting zone, thus enabling it to be cooled effectively.

According to one development, at least one of the coolant outlet center axes is essentially directed at a mounting pocket for a cutting insert. The coolant outlet center axis is thus at the same time set up for cooling a cutting insert, insofar as this is installed in the mounting pocket. Here, an efficient cooling results in a long service life and a high cutting performance of the cutting insert. This is thus ensured.

In this instance, the at least one of the lateral coolant outlet center axes, seen in side view, can be inclined upwards in relation to the extension direction of the turning tool holder head by 0 degrees to 80 degrees, in particular by 15 degrees to 60 degrees, more particularly by 35 degrees to 50 degrees. A side view is to be understood here as a view of the side face on which the coolant outlet is arranged. From a global perspective, the view is directed perpendicular onto the side face. In particularly preferred embodiment, the slope angle is essentially 45 degrees. In this way, the coolant outlet center axis can be precisely aligned toward a cutting zone or a cutting insert so that an effective cooling is present. Long tool service lives and high cutting performances are thus achieved.

In particular, the at least one lateral coolant outlet is arranged on a face of the laterally projecting extension whose surface normal, seen in plan view, is predominantly oriented along the extension direction of the turning tool holder head. In this way, coolant can be introduced particularly simply and efficiently into the cutting zone and/or be applied to the cutting insert.

The laterally projecting extension preferably has a plate-shaped design and, seen from the side, its thickness runs in the longitudinal extension direction of the turning tool holder head. In addition, it preferably has a front face facing toward a mounting pocket for a cutting insert, at which front face at least one frontal coolant outlet terminates. The thickness of the plate-shaped extension is therefore to be measured, in particular perpendicular to the side face. In this way, coolant can be delivered easily and directly in the direction of the mounting pocket. A cutting insert installed there can thus be cooled particularly effectively.

The front face can be directed obliquely upwards to the top face and to the cutting-insert end of the turning tool holder head. Thus, the at least one lateral coolant outlet arranged on the front face is oriented in the same way. It is thus essentially directed at the cutting zone, thus enabling it to be cooled effectively.

Furthermore, an additional coolant outlet or a plurality of additional coolant outlets can be provided on the top face, wherein in particular a coolant outlet center axis of the additional coolant outlet or coolant outlet center axes of the additional coolant outlets is or are substantially directed at a mounting pocket for a cutting insert. A particularly effective and uniform cooling of the cutting zone and of a cutting insert installed in the mounting pocket results in conjunction with the lateral coolant outlets according to the invention.

The coolant outlet or the coolant outlets on the top face is or are preferably connected in a coolant-conducting manner to a coolant inlet, wherein the coolant inlet is arranged on the tool-holder shank, in particular on its underside as seen in its installed position. The coolant inlet is thus easily accessible and connectable in a simple manner to a coolant supply system of the machine tool on which the turning tool holder is being used. Alternatively, the turning tool holder can also be connected in a simple manner to an external coolant supply system separate from the machine tool. Moreover, the at least one lateral coolant outlet emerging from the side face and the at least one coolant outlet emerging from the top face are supplied by mutually separate coolant inlets that are provided on different faces of the turning tool holder shank. This means that the two coolant outlets can be supplied with coolant independently of one another. This enables the use on the whole of particularly large volumetric flows for cooling a cutting zone and/or a cutting insert.

If at least one lateral coolant outlet, at least one frontal coolant outlet, and at least one additional coolant outlet are used, a cutting zone can be cooled from three sides. It is therefore even possible to speak of a three-dimensional cooling or 3D cooling.

Here, the additional coolant outlet can cool a cutting face, the frontal coolant can cool a first flank, and the lateral coolant outlet can cool a second flank. The first flank can be associated with a secondary cutting edge and the second flank can be associated with a main cutting edge, or vice versa. In this way, a main cutting edge and/or a secondary cutting edge is or are reliably cooled.

Such a 3D cooling is advantageous in particular in the field of heavy machining, thus in the machining of materials that are difficult to cut, and in the field of roughing work.

In the event of heavy-duty machining, a comparably large amount of process heat, which must be reliably dissipated, is created in the cutting zone.

The same applies to roughing work, in which in particular a high removal volume is involved. In addition, in roughing work comparably long main cutting edges are preferably used which can be reliably cooled in this way.

The turning tool holder shank is preferably designed as a clamping shank and/or has a substantially rectangular cross-section. In particular, the cross-section is square. Turning tool holder shanks of this kind are known from the prior art and have proven themselves. A turning tool holder with such a design can be used universally in various turning machines. The object is also achieved by using a turning tool with a turning tool holder according to the invention, in particular wherein a cutting insert is installed on the turning tool holder. The cutting insert is preferably arranged in the mounting pocket and can be an indexable insert. Here, the cutting insert can be attached to the turning tool holder by any conventional method, in particular by screwing or clamping. In addition, the (main) cutting face of the cutting insert is preferably oriented in the same direction as the top face of the turning tool holder.

Alternatively, the turning tool holder shank can also have circular cross-section or a proprietary shape. By a turning tool holder shank with a proprietary shape, what is meant is a shank that, due to its geometry, can only be combined with certain machine tools. For example, such a turning tool holder shank of proprietary shape can be used only on machines of a particular manufacturer or of a particular type.

All lateral coolant outlet center axes are thereby preferably and essentially directed towards a main cutting edge and/or a secondary cutting edge of the cutting insert. In this way, a particularly effective and homogeneous cooling of the cutting insert is achieved.

In a particularly preferred embodiment, a flank cooling of a main cutting edge of the cutting insert is carried out by means of the lateral coolant outlets.

Additionally or alternatively, all of the frontal coolant outlet center axes can be essentially directed towards a main cutting edge and/or a secondary cutting edge of the cutting insert. This too leads to an effective cooling of the cutting insert.

In an advantageous variant, a flank cooling of a secondary cutting edge of the cutting insert is carried out by means of the frontal coolant outlet.

All of the coolant outlet center axes of the additional coolant outlets can also be essentially directed towards a main cutting edge and/or a secondary cutting edge of the cutting insert.

A cutting face cooling is thereby preferably carried out by means of the additional coolant outlets.

In a combination of the aforementioned examples, both a flank associated with a main cutting edge and a flank associated with a secondary cutting edge are cooled, and also a cutting face.

BRIEF DESCRIPTION OF THE DRAWINGS

The invention is explained below with reference to various embodiments which are shown in the accompanying drawings. In the figures.

DETAILED DESCRIPTION

Figure 1:
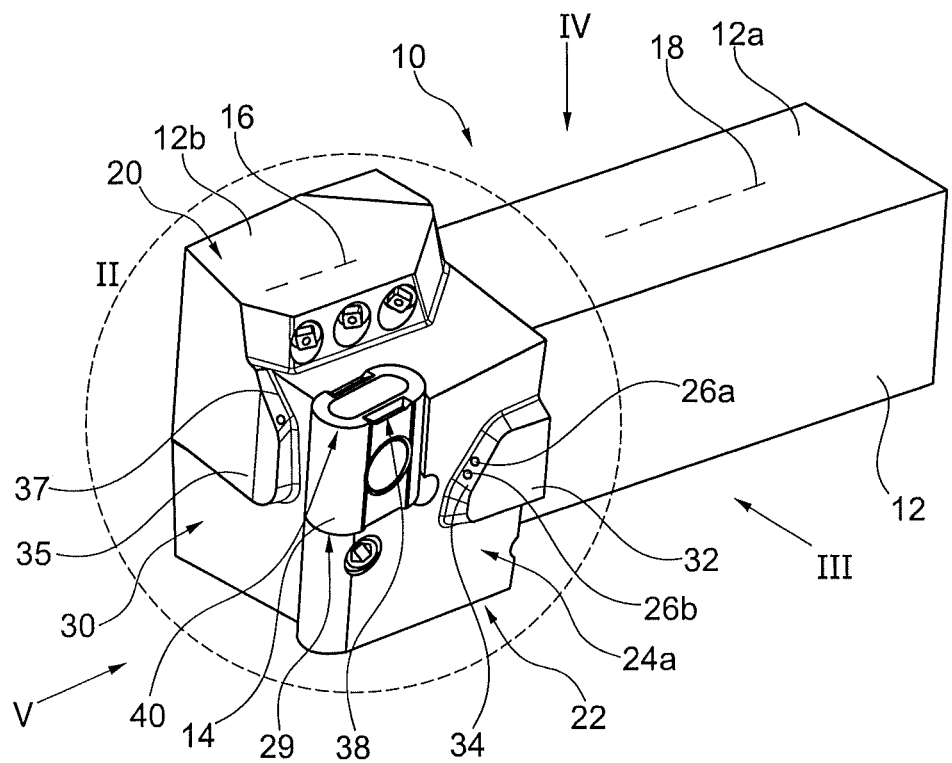
FIG. 1 a turning tool according to the invention, with a turning tool holder according to the invention according to a first embodiment, FIG. 2 a detail II of the turning tool in FIG. 1, FIG. 3 a side view III of the turning tool according to FIG. 1, FIG. 4 a plan view IV of the turning tool in FIG. 1, FIG. 5 a front view V of the turning tool in FIG. 1, FIG. 6 a turning tool according to the invention, with a turning tool holder according to the invention according to a second embodiment, FIG. 7 a detail VII of the turning tool in FIG. 6, FIG. 8 a plan view VIII of the turning tool according to FIG. 6, FIG. 9 a side view IX of the turning tool according to FIG. 6, and FIG. 10 a front view X of the turning tool in FIG. 6.

FIG. 1 shows a turning tool 10, presented in the installed position, with a turning tool holder 12 on which is installed a cutting insert 14 designed as an indexable insert.

The turning tool holder 12 comprises a turning tool holder shank 12*a* and a turning tool holder head 12*b*.

The turning tool holder shank 12*a* is thereby designed as a clamping shank with a substantially rectangular cross-section.

The depicted turning tool holder 12 is a holder of neutral design. A longitudinal extension direction 16 of the turning tool holder head 12*b* and a longitudinal extension direction 18 of the turning tool holder shank 12*a* thereby enclose an angle α of 180°. The longitudinal extension direction 16 of the turning tool holder head 12*b* is therefore a straight continuation of the longitudinal extension direction 18 of the turning tool holder shank 12*a*.

In the present instance, the cutting insert is installed with a tool cutting angle of approx. 93°.

The turning tool holder head 12b, which is substantially rectangular in cross-section, comprises a top face 20 as seen in its longitudinal extension direction 16 and in its installation position.

Opposite this is an underside face 22.

Furthermore, the turning tool holder head 12b comprises two opposite side faces 24a, 24b, in each case connecting the top face 20 and the underside face 22.

In the embodiment illustrated in FIGS. 1 through 5, two coolant outlets 26a, 26b are provided on the side face 24a.

Figure 4:
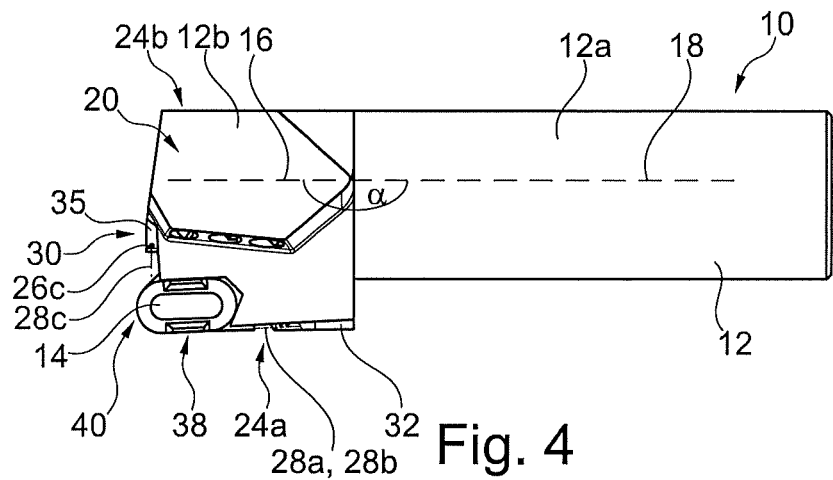

In a view of the top face 20, the respective associated coolant outlet center axes 28a, 28b of the coolant outlets 26a, 26b predominantly extend along the longitudinal extension direction 16 of the turning tool holder head 12b (see FIG. 4).

The coolant outlet center axes 28a, 28b are thus oriented substantially parallel to the longitudinal extension direction 16.

At the same time, the coolant outlet center axes 28a, 28b are essentially directed toward a mounting pocket 29 in which in the illustrated embodiment of the cutting insert 14 is installed.

In a side view, thus in particular in a substantially vertical view of the side face 24a, the coolant outlet center axes 28a, 28b are inclined upward by an angle of $\varphi_a$ or $\varphi_b$ of approximately 45° (see FIG. 3), and namely laterally toward the cutting edge of the cutting insert 14, relative to the longitudinal extension direction 16 of the turning tool holder head 12b.

At the point at which the coolant outlets 26a, 26b emerge from the side face 24a, a laterally projecting extension 32 is formed which is plate-shaped.

The thickness of the plate-shaped extension 32 is thereby to be measured laterally as viewed in the longitudinal extension direction 16.

Expressed more precisely, the coolant outlets 26a, 26b are arranged on a front face 34 of the extension 32 which points in the direction of the mounting pocket 29 in which the cutting insert 14 is installed.

In the installation position of the turning tool 10, the front face 34 thus points obliquely upwards to the top face 20 and to the cutting insert end of the turning tool holder head 12b.

The arrangement of the coolant outlets 26a, 26b on the extension 32 thereby represents a preferred embodiment. In an alternative embodiment, not shown, the coolant outlets 26a, 26b may also emerge directly from one of the side faces 24a, 24b without an extension 32 being provided.

In addition, the turning tool holder 12 comprises a front face 30 that is provided on a face of the turning tool holder head 12b, said face being opposite to the turning tool holder shank 12a.

A coolant outlet, more precisely stated a frontal coolant outlet 26a with a frontal coolant outlet center axis 28c, is also provided on the front face 30.

In the illustrated embodiment, this is provided on a frontally projecting extension 35, analogous to the laterally projecting extension 32.

In this context, it is alternatively possible that the frontal coolant outlet 26c emerges directly from the front face 30, in other words, with no extension 35 provided (not shown).

In this instance, the coolant outlet 26c terminates at a front face 37 that points toward the mounting pocket 29.

Seen in plan view, the frontal coolant outlet center axis 28c is thereby predominantly oriented transversal to the longitudinal extension direction 16 of the turning tool holder head 12b (see FIG. 4).

Figure 5:
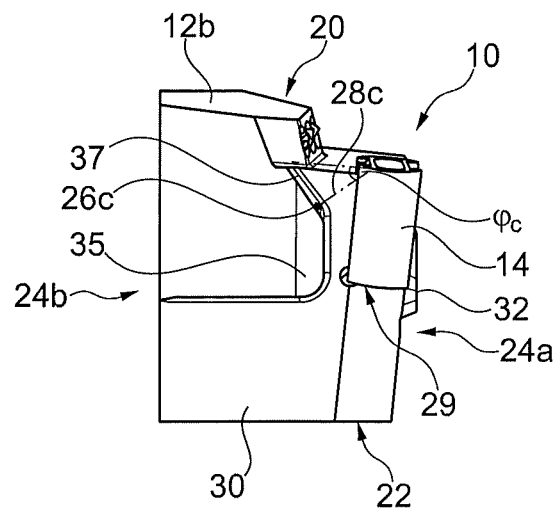
Figure 6:
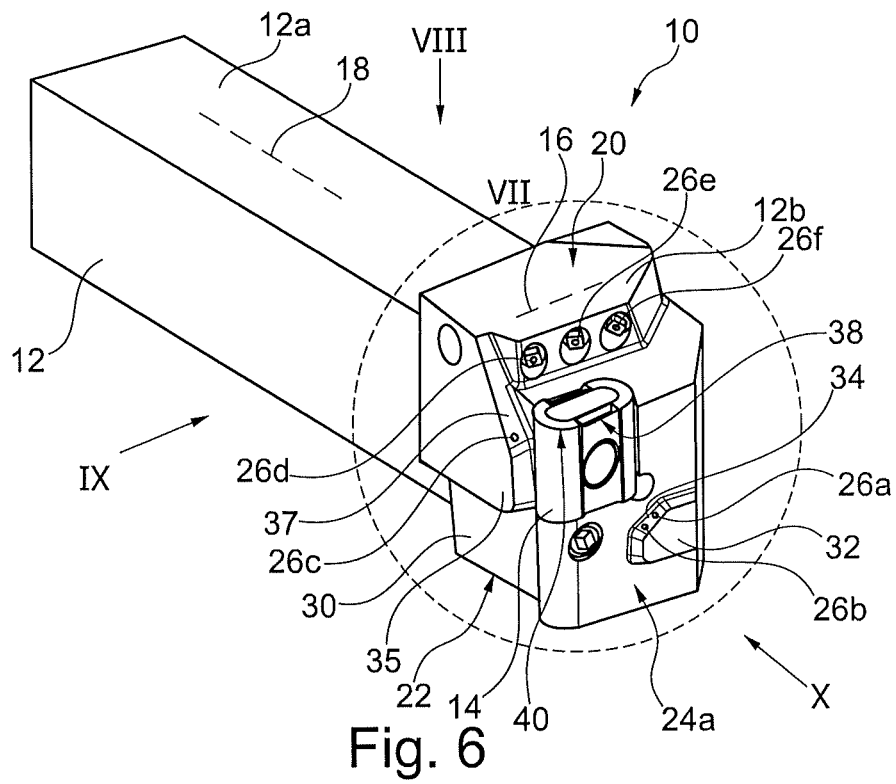
Figure 7:
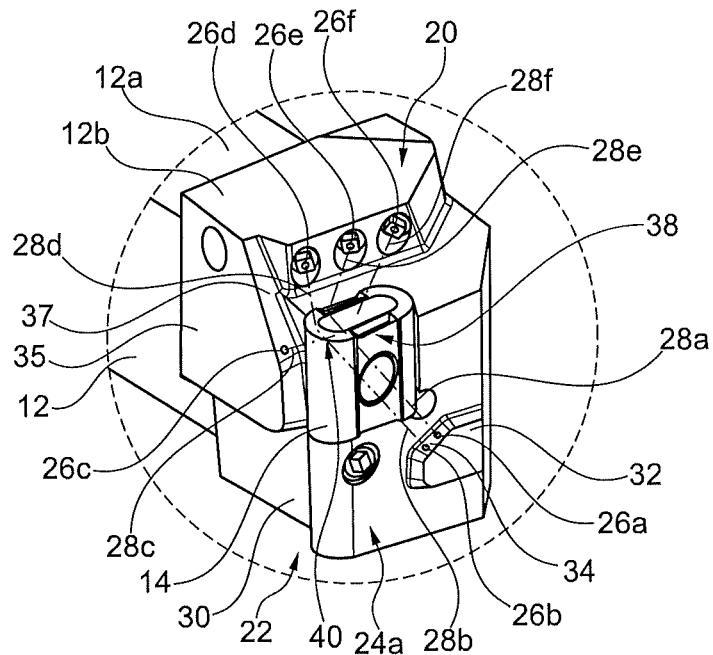
Figure 8:
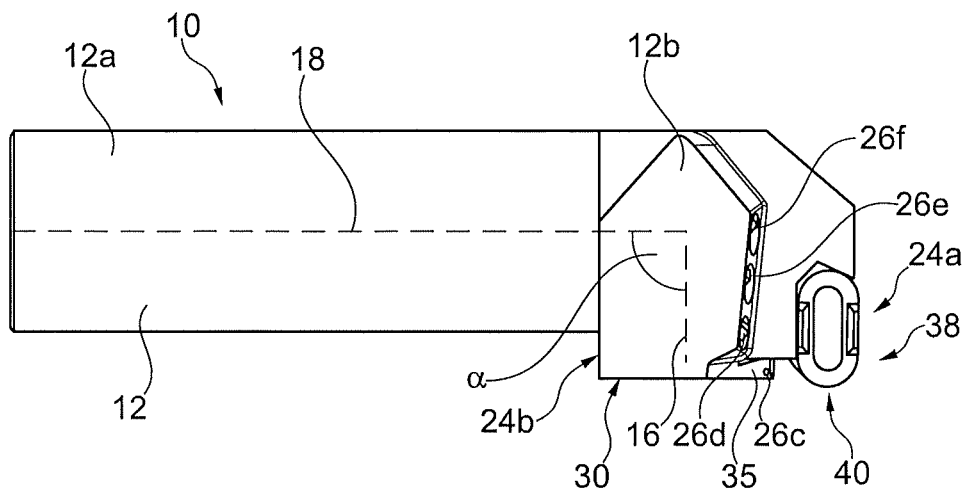
Figure 9:
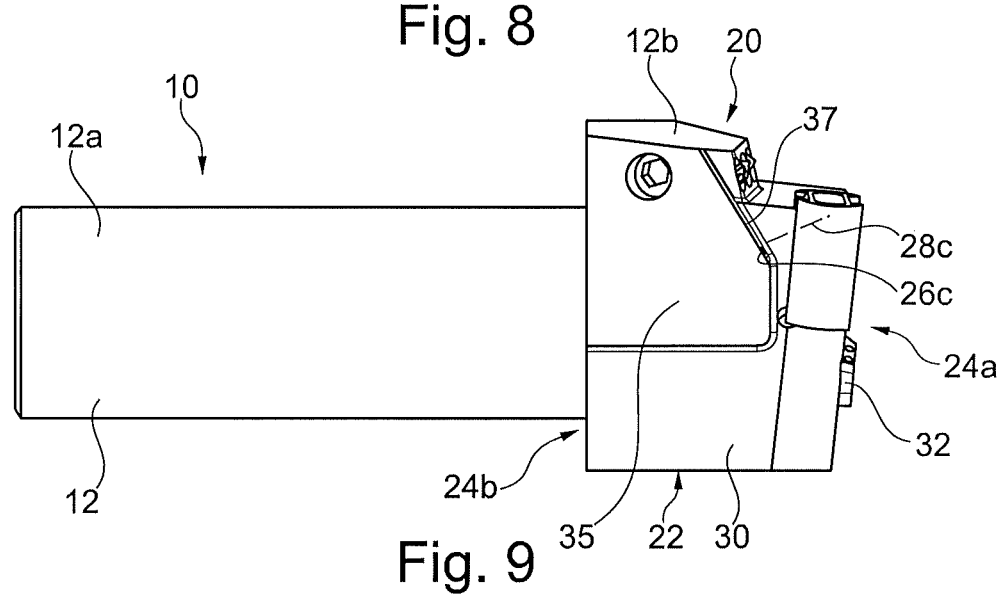
Figure 10:
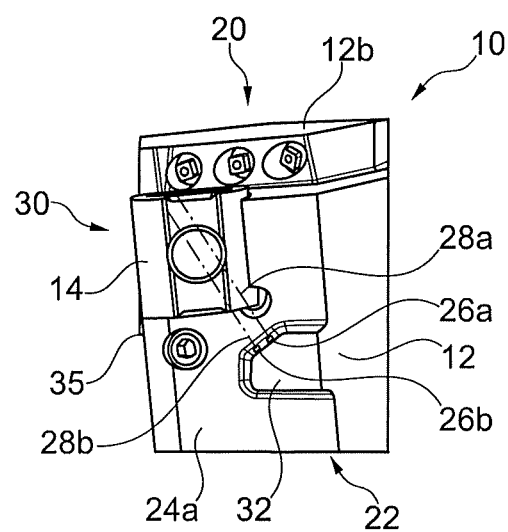

In a front face view or frontal view, the frontal coolant outlet center axis 28c is inclined upward by an angle $\varphi_c$ of 0 degrees to 80 degrees, in particular from 15 degrees to 60 degrees, more particularly from 35 degrees to 50 degrees (see FIG. 5).

The frontally projecting extension 35 is also of a plate-shaped design.

In contrast to the laterally projecting extension 32, however, its thickness does extend in the longitudinal extension direction 16 of the turning tool holder head 12a.

In the illustrated exemplary embodiment, three additional coolant outlets 26d, 26e and 26f are arranged on the top face 20.

The associated coolant outlet center axes 28d, 28e and 28f are essentially directed at the mounting pocket 29 in which the cutting insert 14 is installed.

In the shown embodiment, all of the lateral coolant outlet central axes 28a, 28b are therefore essentially directed at a main cutting edge 38 of the cutting insert 14.

The frontal coolant outlet center axis 28c is essentially directed at a secondary cutting edge 40 of the cutting insert 14.

In addition, all of the coolant outlet center axes 28d, 28e, 28f of the additional coolant outlets 26d, 26e, 26f are essentially directed at a cutting face lying between the main cutting edge 38 and the secondary cutting edge 40.

The cutting insert 14, or expressed more precisely its cutting edge, is thus cooled from three directions, which is why the term 3D cooling can also be used.

FIGS. 6 through 10 show a variant of the turning tool 10 in which the turning tool holder head 12b is bent or offset at a right angle relative to the turning tool holder shank 12a. In this embodiment, the longitudinal extension direction 16 of the turning tool holder head 12b is thus a longitudinal extension direction 18 of the turning tool holder shank 12a continuing across an angle α, wherein the angle α is 90°.

Figure 2:
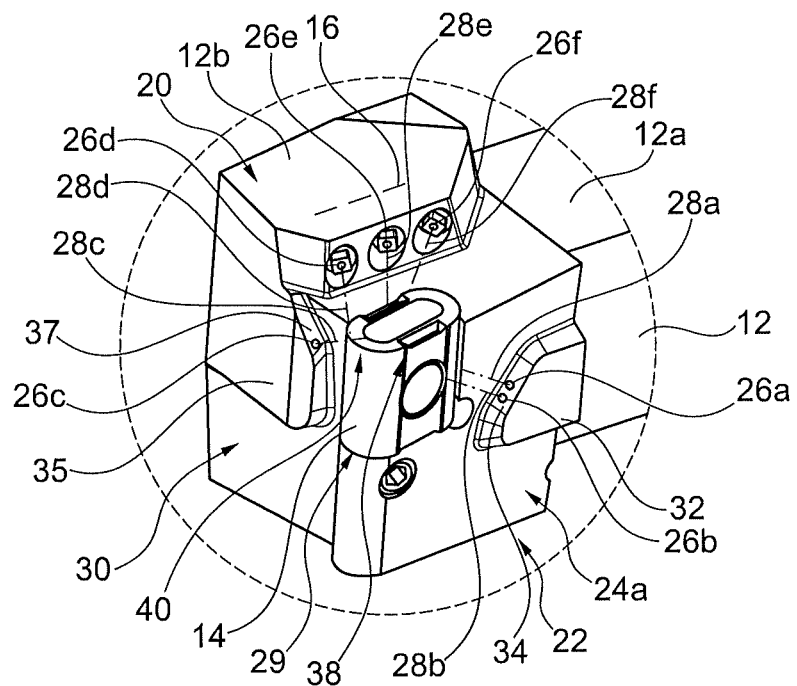
Figure 3:
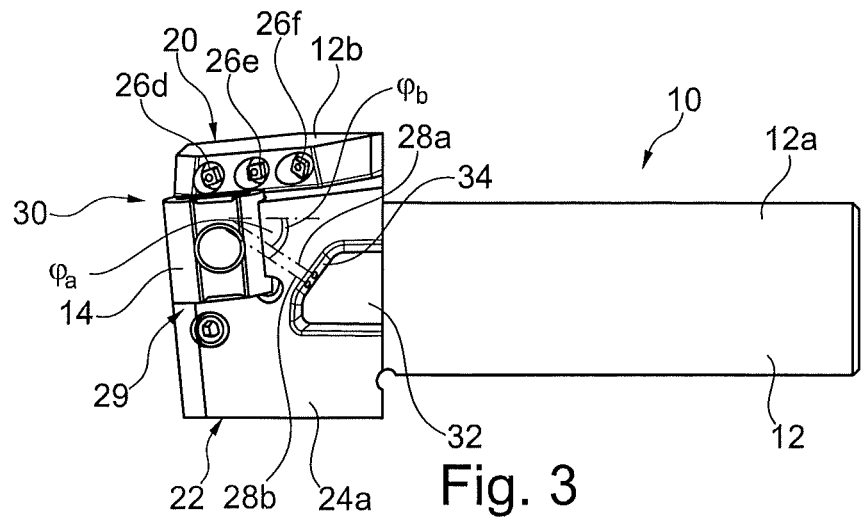

The variant according to FIG. 2 is also shown in the installed position.

Because the turning tool in accordance with the second embodiment is otherwise constructed corresponding to the first embodiment (see FIGS. 1 through 5), reference is made to the above explanations.

In a further variant, not shown, a radius could also be provided instead of the angle α, so that the longitudinal extension direction 16 of the turning tool holder head 12b is then the longitudinal extension direction 18 of the turning tool holder shank 12a continued via a radius.

The invention claimed is:

1. A turning tool holder, comprising:
   a turning tool holder shank having a longitudinal extension direction; and
   a turning tool holder head having a mounting pocket configured for mounting a cutting insert therein, the turning tool holder head having a longitudinal extension direction, the turning tool holder head including a top face, an underside face opposite the top face, two opposing side faces connecting the top face and the underside face, and a front face opposite the turning tool holder shank,
   wherein the front face includes a frontally projecting extension having a frontal coolant outlet, the frontal coolant outlet having a frontal coolant outlet center axis oriented in a direction that is substantially transverse to the longitudinal extension direction of the turning tool holder head and directed toward the mounting pocket for the cutting insert, wherein the top face includes at least one coolant outlet having a coolant outlet center axis oriented in a direction that is substantially transverse to the longitudinal extension direction of the turning tool holder head and directed toward the mounting pocket for the cutting insert, wherein one of the two opposing side faces includes a laterally projecting extension having at least one coolant outlet with a coolant outlet center axis oriented in a direction that is substantially parallel to the longitudinal extension direction of the turning tool holder head and directed toward the mounting pocket for the cutting insert.

2. The turning tool holder of claim 1, wherein the front face of the frontally projecting extension is facing toward the mounting pocket for the cutting insert.

3. The turning tool holder of claim 1, wherein the frontal coolant outlet center axis is substantially transverse to the lateral coolant outlet center axis.

4. The turning tool holder of claim 1, wherein the frontal coolant outlet center axis is inclined at an upward angle of between about 15 degrees to about 60 degrees with respect to the longitudinal extension direction of the turning tool holder head.

5. The turning tool holder of claim 1, wherein the frontal coolant outlet center axis is inclined at an upward angle of between about 35 to about 50 degrees with respect to the longitudinal extension direction of the turning tool holder head.

6. The turning tool holder of claim 1, wherein the front face is formed at an oblique angle with respect to the top face of the turning tool holder head.

7. The turning tool holder of claim 1, wherein the coolant outlet center axis is substantially transverse to the lateral coolant outlet center axis of the at least one lateral coolant outlet.

8. The turning tool holder of claim 1, wherein the longitudinal extension direction of the turning tool holder shank and the longitudinal extension direction of the turning tool holder shank are aligned at an angle of 180 degrees with respect to each other.

9. The turning tool holder of claim 1, wherein the longitudinal extension direction of the turning tool holder shank and the longitudinal extension direction of the turning tool holder shank are aligned at an angle of 90 degrees with respect to each other.

10. The turning tool holder of claim 1, wherein the lateral coolant outlet center axis is inclined at an angle greater than 0 degrees and less than or equal to about 80 degrees with respect to the longitudinal extension direction of the turning tool holder head.

* * * * *